(12) United States Patent
Monroe, III

(10) Patent No.: US 6,411,454 B1
(45) Date of Patent: Jun. 25, 2002

(54) HEAD CONTROL FOR DISC DRIVE APPARATUSES, SYSTEMS AND PROCESSES

(75) Inventor: Albert D. Monroe, III, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/259,837

(22) Filed: Mar. 1, 1999

(51) Int. Cl.[7] ............................ G11B 15/12; G11B 19/02
(52) U.S. Cl. ........................ 360/63; 360/69; 360/75; 711/4; 711/111
(58) Field of Search ............................ 360/75, 69, 48, 360/61, 63; 711/4, 111

(56) References Cited

U.S. PATENT DOCUMENTS

| | | | | | |
|---|---|---|---|---|---|
| 5,463,758 A | * | 10/1995 | Ottesen | ...................... | 395/441 |
| 5,592,648 A | * | 1/1997 | Schultz et al. | ............... | 395/441 |
| 6,112,277 A | * | 8/2000 | Bui et al. | .................... | 711/114 |
| 6,163,422 A | * | 12/2000 | Blumenau | .................... | 360/47 |
| 6,170,037 B1 | * | 1/2001 | Blumenau | ................... | 711/114 |

* cited by examiner

Primary Examiner—Andrew L. Sniezek
(74) Attorney, Agent, or Firm—Merchant & Gould P.C.

(57) ABSTRACT

A method of associating data with a plurality of heads in a disc drive apparatus employs heads disposed in physical locations in a head array. A plurality of data sets are provided, wherein each data set is associated with an address corresponding to the physical location of a respective head in the head array. In addition, the number of heads in the disc drive apparatus is determined and, based on the number of heads, a new head location scheme is selected. The new head location scheme defines a new head location for each physical head location address. Each data set is then associated with the new head location associated, in the new head location scheme, with the physical head location address associated with the data set.

22 Claims, 4 Drawing Sheets

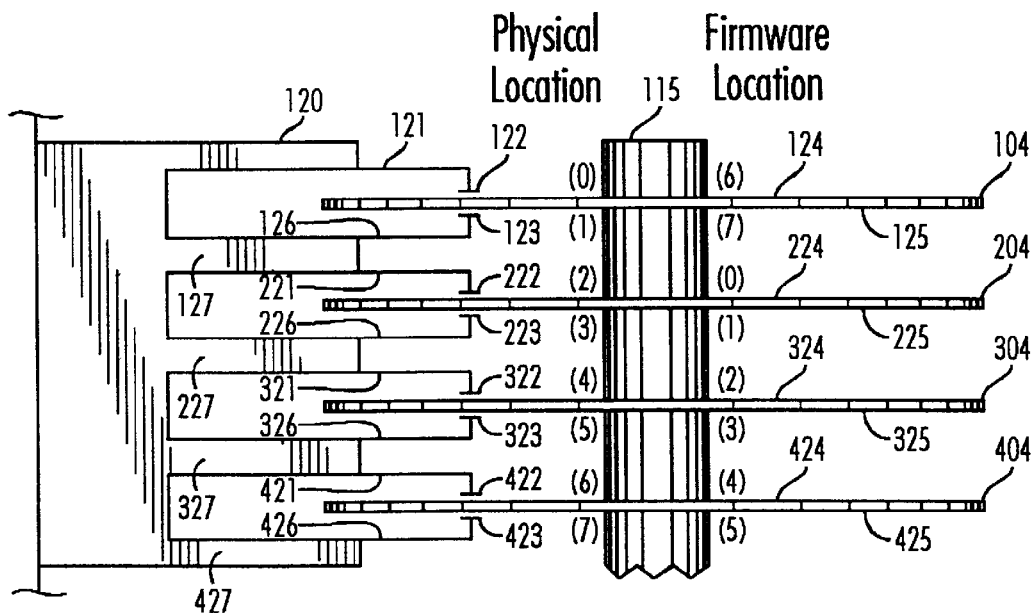
FIG. 4
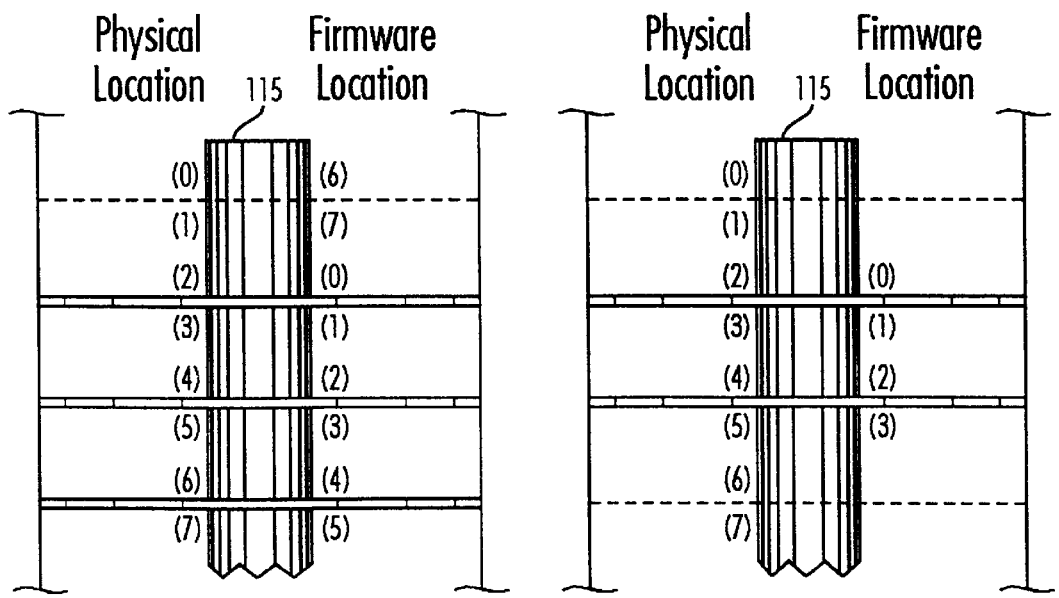
FIG. 5
FIG. 6

HEAD CONTROL FOR DISC DRIVE APPARATUSES, SYSTEMS AND PROCESSES

FIELD OF THE INVENTION

The invention relates, generally, to disc drive systems and methods of making, testing and using the same, which involve arranging a plurality of heads and recording surfaces in a stack and in preferred embodiments to such systems and methods wherein data is associated with the plurality of heads depending on a head location scheme for maximizing manufacturing flexibility. Further embodiments involve defining a reading or recording scheme in which data is read or recorded, using an array of heads operated in seriatim and an alternating order relative to the stack of recording surfaces.

BACKGROUND

Modern computers employ various forms of storage systems for storing programs and data. For example, various forms of disc drive systems have been designed to operate under the control of a computer to record information and/or retrieve recorded information on one or more recording discs. Such disc drives include hard disc drives which employ recording discs that have magnetizable (hard) recording material, optical disc drives which employ recording discs that have optically readable recording material, magneto-optical (MO) disc drives which employ recording discs that have optically readable magnetizable recording material, or the like.

Conventional disc drive systems typically include one or more recording discs supported for relatively high speed rotation on a rotary spindle. In systems employing more than one recording disc, the discs are typically arranged in a stack on the spindle. The recording surfaces of such stacked discs are accessed by the read/write heads which are mounted on a complementary stack of actuator arms which form a part of an actuator assembly. Typically, the actuator assembly has an actuator body that pivots about a pivot mechanism disposed in a medial portion thereof. A motor selectively positions a proximal end of the actuator body. This positioning of the proximal end in cooperation with the pivot mechanism causes a distal end of the actuator body, which supports the read/write heads, to move generally radially across the recording surfaces of the discs, such that the head may be selectively positioned adjacent any recording location on the recording surface, as the disc is rotated.

In operation, the heads are moved in the generally radial direction to align or register with a desired track locations on the recording surfaces of the discs. Once aligned or registered with the desired track location, the heads are operated to read or write information onto the recording surface at the desired track location.

For example, FIG. 1 shows a top-down view of a single disc recording surface 11 of disc 10, which may, for example, be the top disc in a stack of discs. FIG. 1 also shows a head assembly structure, supporting a recording and/or reading head 12 adjacent the recording surface 11. The recording surface 11 defines multiple, concentric recording tracks. While modern recording disc technology allows for a much greater track density than that shown in FIG. 1, a number of widely spaced tracks, labeled 0–4 are illustrated in exaggerated widths and interspacings, to simplify the drawings.

In FIG. 1, the head 12 is supported on a suspension member 13 of a head support arm 14. As described above, the arm 14 is coupled to (or part of) an actuator, such as a voice coil motor or other suitable actuation device 16. Also as described above, the actuator 16 is connected to suitable control electronics for controlled movement of the arm 14 and, thus, controlled positioning of the head 12 relative to the radial dimension of the disc surface 11.

More specifically, selective activation of the actuator 16 causes selective pivotal movement of arm 14 about the pivot joint 15. Such selective pivotal arm motion results in selective motion of the head 12 in the cross-track direction (generally in the radial dimension of the disc surface), as indicated by arrows 18. In this manner, the head 12 may be selectively positioned adjacent a particular track for recording and/or reading on that track. For example, in FIG. 1, the head 12 is positioned for reading and/or recording on track 3. However, by selectively activating the actuator 16 to pivot the arm 14, the head 12 may be moved to a new head position, adjacent another track.

During reading or recording operations, the disc is rotated on a spindle hub 20. The disc rotation is represented in FIG. 1 by arrow 19. For any given head position (such as the track 3 position of head 12 in FIG. 1), the entire track passes adjacent the head in each compete revolution of the disc. Moreover, as described above, the head 12 may be selectively moved to any track location on the disc. Thus, the head 12 may be capable of being positioned, relative to the disc surface 11, for reading or recording data on any portion of any track on the disc surface. For further recording capacity, double-sided disc systems employ a second head 22 similarly supported and positionable adjacent a second set of recording tracks on the opposite facing surface 21 of disc 10, as shown in FIG. 2.

Yet greater recording capacity and recording or retrieving speeds can be achieved with multiple disc systems. As can be readily appreciated, for a given disc size and recording density, the recording capacity of a multiple disc system can increase by up to about N times the capacity of a single disc system, wherein N is the number of discs in the multiple disc system. In addition, multiple disc systems can provide improved recording and/or reading speeds, relative to single disc systems, in that data may be read from multiple tracks (one track for each disc surface) at each given track position of the head array. In contrast, for a single disc system, at most, two tracks may be read or recorded (in a double-sided disc arrangement) before the head array must seek the next track position, resulting in greater overall head re-positioning delays, as compared to the capabilities of multiple disc system technology.

The number of discs included in a disc drive system is typically based on the demands of the intended application of use of the system. Various factors, such as, but not limited to recording capacity, speed, cost, size, weight and the like can affect the determination of the number of discs (and heads) to be included in a particular disc drive system. As a whole, the demand in the disc drive industry varies widely. Some applications of use require the capability to store large amounts of data or fast retrieval and/or recording speeds and, thus, require a relatively large number of discs. Yet other applications require low cost and/or involve lower storage capacity demands and, thus, require fewer discs. However, it is typically not economically efficient to design a completely different disc drive system for each different application of use.

Accordingly, there is a need in the disc drive industry to meet such varying demands and, at the same time, produce high quality products in a cost efficient manner.

Furthermore, in many applications of use of disc drive systems having a stack arrangement of discs and heads, it is desirable to maximize the reading or recording speed. In typical multiple disc systems, a plurality of discs are arranged in a stack on a common hub, such that track 1 of each disc in the stack is generally in alignment with track 1 of the other discs in the stack, track 2 of each disc is generally aligned with track 2 of the other discs, and so forth. In this manner the generally aligned tracks of the stack of discs define concentric cylinders, which correspond to the similarly numbered tracks in FIG. 1, as cylinder 0, cylinder 1, cylinder 2, and so forth. A plurality of heads on a common head/arm actuator structure are arranged in an array adjacent the discs in the stack such that a respective head is associated with each respective recording surface in the disc stack.

As the array is moved by the actuator in the cross-track direction (for example, the general radial direction of the disc), the heads in the array become aligned with tracks on the disc recoding surfaces in the stack and, when properly aligned, may be operated to access such tracks, for example as part of a record or read operation. If the heads are arranged in the array to substantially simultaneously seek tracks in a common cylinder with respect to the other heads in the array, then at each cylinder position of the head array along the cross-track (or generally radial) movement, a plurality of tracks (or all of the tracks) in a common cylinder may accessed by switching the reading or recording operation from one head to another (typically, with minor alignment adjustments upon switching operation between heads).

More particularly, if simultaneous alignment were achieved, then at each given cylinder position of the head array, a reading or recording operation requiring a plurality of tracks could be carried out over a plurality of discs, by operating a plurality of heads in series without seeking a further track (cylinder) position. While there is typically some delay associated with electronically switching the reading or recording operation from one head to another, it is typically faster to electronically switch heads and make minor alignment adjustments (to effectively switch from one track to another), as compared to physically moving a head from one track location to seek another track location and then re-aligning the head at the new track position on a single disc surface.

Accordingly, for recording or reading operations involving more than one track, disc drive systems having multiple heads and multiple recording surfaces (including those involving multiple discs) arranged in a stack can be operated to switch the recording or reading operation from one head to another head to change tracks during recording or reading to improve recording or reading speed. However, even with such head switching functions, where a reading or recording operation involves more tracks than the number of heads in the array, the actuator still must be controlled to seek a further track (or cylinder) position during the recording or reading operation, to reposition the heads adjacent additional tracks, for example, of the next cylinder. Such track seeking operations result in further delays.

The overall reading or recording speed may, therefore, depend, in part, on the delays associated with switching heads and with seeking track (or cylinder) positions of the head array. Accordingly, there is a further need in the industry for minimizing such delays and, therefore, maximizing the reading or recording speed capability of disc drive systems and processes.

SUMMARY OF THE DISCLOSURE

Therefore, embodiments of the present invention involve disc drive systems and methods for making, using and testing the same, to address varying industry demands and provide manufacturing flexibility to meet the varying demands in a cost efficient manner.

Further embodiments of the present invention involve disc drive systems and methods for making and using the same for maximizing the reading or recording speed capability of disc drive systems and processes.

According to embodiments of the present invention disc drive systems and methods for making, testing and using the same involve arrangements of discs and heads and processes or means for defining the head locations and mapping data to correspond to such head locations in a manner which maximizes the flexibility of a system design to accommodate a variety of different disc totals. With such flexibility, the same general system design (with minimal modifications) may accommodate a variety of different disc drive systems, to meet a variety of different industry demands.

In preferred embodiments, disc and head locations are defined in a manner to cost efficiently accommodate at least two (and more preferably, three) different disc totals. For example, in one preferred embodiment, a disc drive system design can accommodate a total of either two, three or four discs, with minimal modifications to the disc drive device hardware and software. According to one aspect of the invention, the same hub may be employed with either the two, three or four disc system, wherein the selected number of discs are arranged on a spindle in a manner which most efficiently maintains balance and also accommodates easy removal or addition of discs during manufacture to define or re-define the total number of discs in the system. According to a further aspect of the invention, test and operation data and parameters that are normally associated with each head, based on the physical location of the head, are mapped to be associated with that two, three or four disc arrangement and, thus head assignments associated therewith. Principles of the invention may be applied to other systems involving combinations of different disc totals other than the two, three and four disc combination described above.

In further preferred embodiments, a reading or recording scheme involves operating an array of heads in seriatim and an alternating order relative to the stack of recording surfaces. For example, as the actuator moves the head array in the cross-track direction (for example, the general radial direction of the disc), the heads in the array become aligned with tracks on the disc recoding surfaces in the stack. Preferably the head array is arranged such that a plurality (and more preferably, all) of the heads in the array are at least generally aligned with a respective track at about the same time. By operating a plurality of heads in the array in at each alignment position, a plurality of tracks in mutually different levels of the stack may be accessed in series, as part of a reading or recording operation. Thus, while minor alignments may be needed as the reading or recording operation switches from one head to another, a track seeking operation need not be required when switching heads.

Once the head array operation has been switched one pass through the series of heads (for example, from the top of the stack, down, or from the bottom of the stack, up), a further track position may be sought and the head array continues its cross-track movement toward the next track position. However, instead of returning the head operation to the beginning of the series defined by the previous pass (at the previous track alignment position), the head operation continues with the operation of the head last operated in the previous pass. Operation thereafter switches through the array of heads, in series, but in reverse order with respect to the order of the previous pass (at the previous track alignment position).

As a result, a recording or reading operation involves switching operation of the heads in the array in series with respect to the stack (for example, top down or bottom up) at each general track alignment position in the cross-track (generally radial) motion of the head array, and alternating the direction in which the heads are operated at each new track alignment position of the head array, with respect to the previous track alignment position. In this regard, switching access from one track to another during a recording or reading operation involves either switching from one head to another in the series (and, possibly, minor alignment adjustments) or a track seek operation to seek the next track location at the end of a series pass. Unlike prior disc stack systems, however, switching access between tracks would not require both a head switching and a track seeking operation. That is, the head operated as the last head in the series at the previous pass (previous track position of the head array) is the same head that is operated as the first head in the series at the present pass (present track position).

Thus, switching from one track to another during a reading or recording operation involves either a delay associated with switching heads or a delay associated with seeking a next track, and need not involve both delays at any one track switching time. Substantial advantages with respect to minimizing track switching delays are, therefore, available when the head array is operated in series, but alternating order as described herein.

These and various other features as well as advantages which characterize the present invention will be apparent upon reading of the following detailed description and review of the associated drawings.

BRIEF DESCRIPTION OF DRAWINGS

FIG. 4 is a side view of a four-disc stack arrangement according to an embodiment of the present invention.

FIG. 5 is a side view of a three-disc stack arrangement according to an embodiment of the present invention.

FIG. 6 is a side view of a two-disc stack arrangement according to an embodiment of the present invention.

DETAILED DESCRIPTION OF PREFERRED EMBODIMENTS

As noted above, embodiments of the present invention relate, generally, to disc drive systems and methods of making, testing and using the same, which involve arranging a plurality of heads and recording surfaces and associating data therewith depending on a head location scheme for maximizing manufacturing flexibility. Further embodiments of the present invention involve disc drive systems and methods for making and using the same for maximizing the reading or recording speed capability. A representative example of a suitable system environment for a preferred embodiment of the present invention is shown in FIG. 3.

However, it will be understood that aspects of the present invention are not limited to the specific representative examples shown and described herein, but are better defined by the claims.

Figure 3:
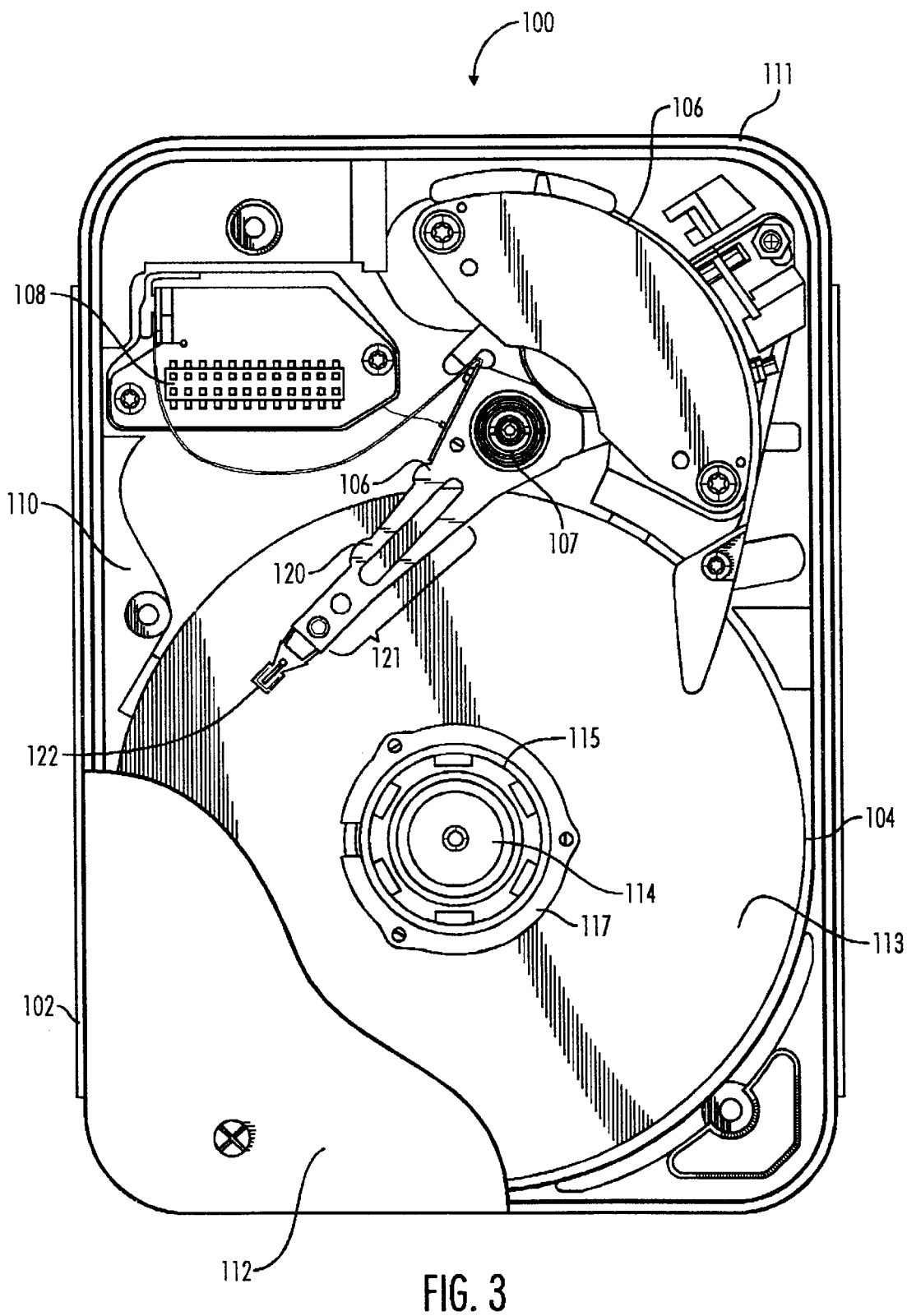
FIG. 3 is a top-down view of a disc drive apparatus environment of a preferred embodiment of the present invention.

FIG. 3 is a top view of a disc drive apparatus 100 including a disc arrangement, according to a preferred embodiment of the instant invention. As shown in FIG. 3, the disc drive apparatus 100 includes a housing 102, at least one data storage disc 104, a head-arm assembly 106 which resides adjacent the data storage disc 104 and a controller 108 (partially shown). FIG. 3 is a top plan view of the disc drive apparatus 100, wherein a top portion of the apparatus 100 has been cut-away to expose a head-arm assembly 106 positioned over the data storage disc 104. It will be understood that numerous details of construction of the disc drive 100 are not included in the following description, as such, they are well known to those skilled in the art and are believed to be unnecessary for the purpose of describing the present invention.

The housing 102 includes a base 110 and a top 112, wherein the base 110 is configured to support the data storage disc 104 and the head-arm assembly 106. The top 112, coupled with the base 110 and a perimeter gasket 111, provide a sealed internal environment for the disc drive 100.

The data storage disc 104 includes a recording surface 113 which defines, for example, concentric circular data tracks (not shown). In other embodiments, the recording surface may define a spiral track configuration. The recording surface 113 is capable of receiving and/or storing information for later use.

A spindle motor 114, encased by a hub 115, is mounted to the base 110. The data storage discs 104, which are centered open discs, are mounted around the hub 115 and secured by a clamp ring 117 for rotation at a constant disc speed. For example, the motor 114 may of a type capable of rotating the hub at rotation speeds of between 7200 to at least 20,000 rpms. In preferred embodiments, the motor 114 comprises a hydrodynamic motor configuration. However, other suitable motor configurations may be employed with further embodiments, without departing from the scope of the present invention.

A head-arm assembly 106 is pivotally supported adjacent the disc 104 by a pivot spindle assembly 107. The head-arm assembly 106 includes an arm 120, a suspension member 121 and a read/write head 122, wherein the head 122 is positioned over the data storage disc 104 at one end of the suspension member 121. The suspension member 121 can be moved across the recording surface 113 of the disc 104, thereby allowing the head 122 to be moved across the recording surface 113 in the cross-track (or generally radial direction of the disc) such that the information on plural track locations along the radial dimension of the disc may be accessed.

The movement of the head-arm assembly 106 is controlled by the controller 108. The controller 108 is attached to the base 110 and is coupled in electronic communication with various further components of the disc drive apparatus 100. The controller 108 represents any suitable control electronics capable of controlling various components of the disc drive, such as, the motor 114 and the head-arm assembly 106. In one preferred embodiment, the controller comprises a processor-controlled integrated circuit board.

In preferred embodiments, a plurality of storage discs 104 are arranged in a stack on a hub coupled to the motor 114 for rotation. The disc stack 104 in FIG. 3 may comprise any suitable number of discs and, preferably includes a plurality of discs supported on a single spindle hub, with an array of heads interposed therebetween, on head support arms and suspension members.

For example, FIG. 4 shows the disc and head arrays of a multiple-disc system, wherein a plurality of discs (four in FIG. 4, numbered from the top down as 104, 204, 304 and 404) are supported on a single hub 115.

A head array comprising a plurality of heads, one for each disc surface, is supported adjacent the disc array, such that each head is adjacent a respective disc surface. In the illustrated four-disc system, eight heads 122, 123, 222, 223, 322, 323, 422 and 423 are respectively positioned adjacent the eight recording surfaces 124, 125, 224, 225, 324, 325, 424 and 425 of the four discs 104, 204, 304 and 404.

Figure 1:
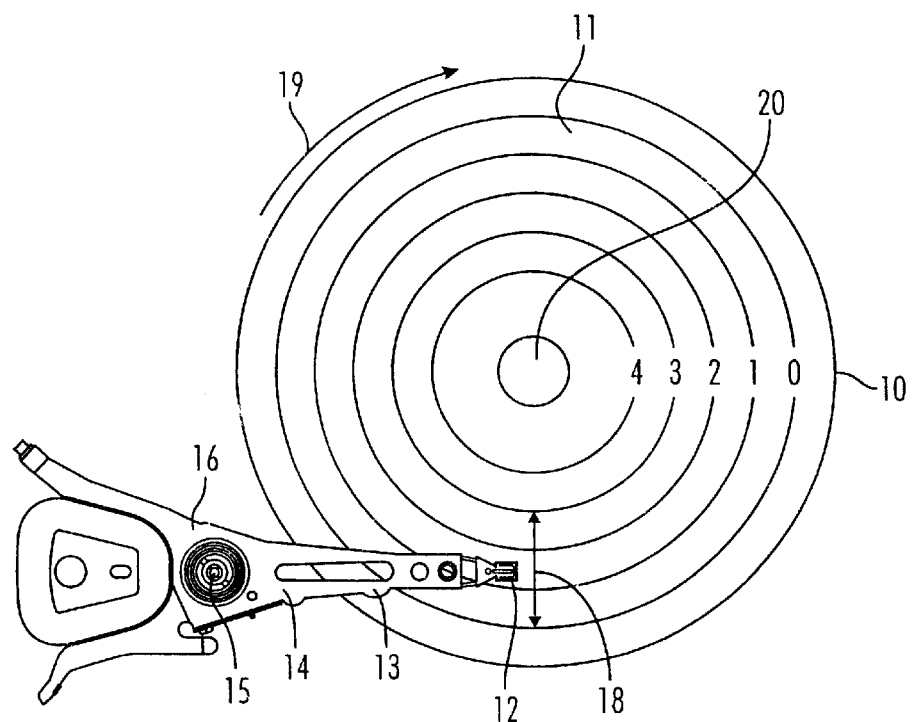
FIG. 1 is a top-down view of a conventional disc and actuator arm structure.
Figure 2:
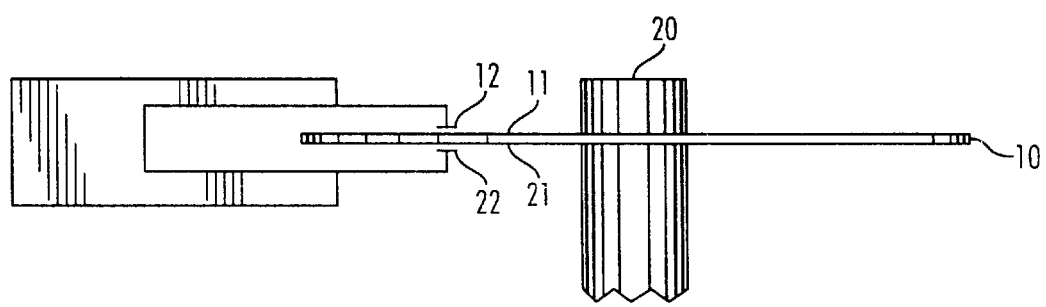
FIG. 2 is a side view of a conventional double-sided disc and actuator arm structure supporting two heads.

The heads in the illustrated multiple disc system are supported by a plurality of suspension members and support arms, which are operatively coupled to (or part of) an actuator for controlled motion, such as the actuator motion described above with respect to FIG. 2. In the four-disc system shown in FIG. 4, each head is coupled to a respective suspension member and each suspension member is coupled to a support arm, as follows: head 122 is associated with suspension member 121 which is coupled to arm 120; head 123 is associated with suspension member 126 which is coupled to arm 127; head 222 is associated with suspension member 221 which is also coupled to arm 127; head 223 is associated with suspension member 226 which is coupled to arm 227; head 322 is associated with suspension member 321 which is also coupled to arm 227; head 323 is associated with suspension member 326 which is coupled to arm 327; head 422 is associated with suspension member 421 which is also coupled to arm 327; and head 423 is associated with suspension member 426 which is coupled to arm 427. In further embodiments, a separate support arm may be provided for each suspension member.

In the illustrated stack arrangement, the four discs 104, 204, 304 and 404 are arranged with disc 104 on the top of the stack (with respect to the orientation shown in FIG. 4), disc 404 on the bottom of the stack and disc 204 between discs 304 and 104. The illustrated disc stack defines a top-down series of recording surfaces, in the following order of surfaces: 124, 125, 224, 225, 324, 325, 424 and 425. Similarly, the heads are supported in an array, defining a top-down series in the following order of heads: 122, 123, 222, 223, 322, 323, 422 and 423, which are associated, one-to-one, with the top-down series of recording surfaces described above.

Thus, in FIG. 4, the number N of discs in the stack supported on the hub 115 is four, and the number of recording surfaces defined in the stack is 2N=8. Thus, at least 2N (eight in FIG. 4) heads are supported in the head array adjacent the 2N (eight in FIG. 4) recording surfaces. The recording capacity of a disc drive apparatus employing a stacked arrangement of discs is dependent on a number of factors, including the track density, the number of tracks per recording surface and the number N of discs in the stack.

As described above, recording capacity demand (and, thus, the number of discs and recording surfaces required in a disc drive apparatus) can vary from application to application. Some applications of use require the capability to store large amounts of data or fast retrieval and/or recording speeds and, thus, require a relatively large storage capacity. Yet other applications require low cost and/or involve lower storage capacity demands. Accordingly, disc drive manufacturers are called upon to design disc drive systems for meeting the varying industry demands in an economical manner.

According to preferred embodiments of the present invention, such varying industry demands may be met by providing a disc drive apparatus that may be readily manufactured with a variety of different numbers N of discs, with minimal modifications to the overall system. Thus, for example, the disc drive apparatus 100 according to one preferred embodiment of the invention, may be configured with N=4 discs (as shown in FIG. 4). Alternatively, with minor modifications, the same disc drive system may be configured with N=3 discs or N=2 discs, as shown in FIGS. 5 and 6, respectively.

By selecting and varying the number of discs used in various different disc drive apparatuses, the recording capacities of the various different apparatuses can be selected and varied, to meet the differing industry demands, without requiring different track densities or disc sizes for the differing demands. Thus, the same disc size and track density (and, thus, much of the same reading and recording control electronics and software) may be employed in various different apparatuses designed to meet various different recording capacity demands.

In preferred embodiments, the hub 115 may support a plurality of different numbers N of discs. For example, as discussed above with respect to FIG. 4, four discs may be supported on the hub 115, while in FIG. 5, hub 115 is shown supporting three discs and, in FIG. 6, the hub 115 is shown supporting two discs. In this manner, the same hub design may be employed with a four-disc apparatus, a three disc apparatus or a two disc apparatus.

In the four-disc, three-disc and two-disc arrangements (FIGS. 4–5), the discs are relatively evenly spaced with respect to each other and are supported at a generally center-balance position on the hub to maximize weight balance, for example, as described in U.S. patent application Ser. No. 09/259,779, now U.S. Pat. No. 6,307,706 titled, "Disc Arrangement On A Hydrodynamic Motor," which is assigned to the assignee of the present invention. In accordance with principles as described in that application, the stack of discs in the three-disc arrangement (FIG. 5) differs from that of the four-disc arrangement (FIG. 4), in that the top disc 104 of the four disc arrangement is not included in the three disc arrangement (the missing disc being represented by broken lines in FIG. 5). Thus, the three-disc arrangement of FIG. 5 includes discs 204, 304 and 404, supported at the same positions on hub 115 as the similarly numbered discs in FIG. 4. In this manner, differences in the disc stack structures of the three and four-disc arrangements are minimized.

Similarly, the stack of discs in the two-disc embodiment (FIG. 6) differs from that of the four-disc arrangement (FIG. 4), in that the top and bottom discs 104 and 404 of the four disc embodiment are not included in the two-disc embodiment (the missing discs being represented by broken lines in FIG. 6). Thus, the two-disc arrangement of FIG. 6 includes discs 204 and 304, supported at the same positions on hub 115 as the similarly numbered discs in FIG. 4. In this manner, differences in the disc stack structures of the two, three and four-disc arrangements are minimized.

Also in preferred embodiments, differences in control electronics and software for controlling the head operations in the two, three and four-disc embodiments are minimized. In such preferred embodiments, the electronics and software is capable of operating the heads on either two, three or four-disc arrangements with little or no modifications. Also in such preferred embodiments, differences between testing schemes for testing two, three or four-disc arrangements are minimized.

According to preferred embodiments, a mapping scheme is employed to map data associated with particular physical head positions in a 2N head array, to a firmware head position common for multiple different stack configurations, each having a different number of discs. The physical head location relates to the physical location in a head array composed of heads associated with the maximum number N of discs that may be supported by the hub. Thus, in the two, three and four-disc arrangements of FIGS. 4–6, the physical head locations are shown on the left sides of the illustrations of the four-disc embodiment, for example, as physical head locations 0, 1, 2, 3, 4, 5, 6 and 7, from the top, down of the series of heads in FIG. 4. The firmware head locations for the four, three and two disc arrangements are shown on the right side of FIGS. 4, 5 and 6, respectively.

In preferred embodiments, the firmware head locations are configured to maximize commonality between the plural different disc number N configurations, to thereby minimize or obviate the need to configure further control electronics or software differently for the different disc number N configurations. Thus, the firmware head locations 0, 1, 2 and 3 correspond to the same disc recording surface locations (locations of surfaces of discs 204 and 304) along the hub 115 in the two, three and four-disc arrangements (FIGS. 4–6). Similarly, the firmware head locations 4 and 5 correspond to the same disc recording surface locations (location of surfaces of disc 404) in the three and four-disc arrangements.

With respect to the embodiments of FIGS. 4–6, a mapping scheme maps the physical head locations in the four-disc arrangement of FIG. 4 onto firmware head locations associated with either a two, three or four disc arrangement, depending on the number N of discs employed in the disc drive apparatus. In this manner data associated with physical head positions for a four-disc arrangement may be mapped to correspond to appropriate firmware head positions in a two-disc arrangement or a three-disc arrangement. In preferred embodiments, the mapping scheme and routines associated with carrying out a mapping operation as described below are imbedded in (or part of) the software or firmware associated with the control electronics for controlling the operation of the array of heads. The electronics and software associated with providing and processing such data may, therefore, be similar or the same for two, three or four-disc arrangements, thereby minimizing the manufacturing differences between those configurations.

Data associated with physical head location may comprise a variety of different types of data, for example, but not limited to check point data, such as bias voltage parameters associated with each head, or other suitable parameters, derived during a self test procedure. Such data may also include, but is not limited to data or instructions associated with a reading or recording operation.

Based on the two, three and four disc arrangements shown in FIGS. 4–6, a preferred mapping scheme comprises a routine for mapping data associated with physical head locations to firmware head locations shown in the Figures according to the mapping schemes as shown in tables I, II and III below.

TABLE I

| FIRMWARE HEAD LOCATION | PHYSICAL HEAD LOCATION |
|---|---|
| 6 | 0 |
| 7 | 1 |

TABLE I-continued

| FIRMWARE HEAD LOCATION | PHYSICAL HEAD LOCATION |
|---|---|
| 0 | 2 |
| 1 | 3 |
| 2 | 4 |
| 3 | 5 |
| 4 | 6 |
| 5 | 7 |

TABLE II

| FIRMWARE HEAD LOCATION | PHYSICAL HEAD LOCATION |
|---|---|
| — | — |
| — | — |
| 0 | 2 |
| 1 | 3 |
| 2 | 4 |
| 3 | 5 |
| 4 | 6 |
| 5 | 7 |

TABLE III

| FIRMWARE HEAD LOCATION | PHYSICAL HEAD LOCATION |
|---|---|
| — | — |
| — | — |
| 0 | 2 |
| 1 | 3 |
| 2 | 4 |
| 3 | 5 |
| — | — |
| — | — |

For example, a mapping process according to an embodiment of the present invention, comprises a step of providing data associated with the physical location of the heads in a head array having N heads. The process also comprises a step of determining the number of disc recording surfaces present in the stack and a step of selecting a mapping scheme based on the number of disc recording surfaces in the stack. The process further involves steps of associating data corresponding with physical head locations to firmware head locations, based on the selected mapping scheme. As described above, the mapping scheme and routines for carrying out a mapping process is preferably imbedded or stored in (or part of) the control hardware, software or firmware of the disc drive apparatus. The disc drive apparatus includes suitable controller electronics and memory devices for processing and storing data associated with performing the above steps.

In preferred embodiments, the step of providing data associated with a physical location on a head array comprises obtaining operating parameters associated with the heads in the array. Such operating parameters may be obtained as part of the procedure, for example, as a self-test routine for testing operating parameters such as, but not limited to, head tuning values for each head, head bias voltage values for each head, defect lists for track sectors of the recording surface associated with each head, or the like. The step of providing data may further include obtaining reading or recording instructions or data associated with the heads in the array. Electronics and software for providing or obtaining such data is readily available to those skilled in the art.

The step of determining the number of discs (or disc recording surfaces) present in the stack arrangement may involve, for example, a routine which first assumes that the array includes the maximum disc number N and attempts to test a head at each physical head location, for example by attempting to perform a reading or recording-and-reading operation with each head in an array of 2N heads. In this manner, the routine identifies the physical head locations which correspond to missing discs (with respect to the maximum disc number N), for example, by identifying physical head locations which failed to read or record-and-read during the test attempt. As a result, the number of discs (or disc recording surfaces) that are present in the stack is also determined.

Alternatively, the step of determining the number of discs may comprise a step of receiving user input data corresponding to the number of discs (or disc recording surfaces), for example, input by a user through a computer system to which the disc drive apparatus is operatively coupled. As a further alternative, the disc number may be pre-recorded by the manufacturer and read from a suitable memory device or firmware associated with the disc drive electronics or on the disc stack itself.

The step of selecting a mapping scheme may comprise, for example, a routine for selecting a pre-recorded mapping scheme based on the number of discs (or disc recording surfaces) present in the stack. Thus, according to preferred embodiments, a plurality of different mapping schemes are recorded, for example, in a suitable memory device or firmware associated with the disc drive electronics or on the disc stack itself. Each mapping scheme is associated with a particular disc number. The step of selecting, therefore, preferably involves selecting from a plurality of pre-stored mapping schemes, a mapping scheme which is associated with the number of discs determined to be in the stack.

With the selected mapping scheme, data corresponding to physical head locations is associated with firmware head locations. Thus, for example, if the number of discs in the stack is determined to be four, then a four-disc mapping scheme, such as shown above in Table III, is selected. As a result, data corresponding to the physical head location 0 (or head 122) of the four-disc stack shown in FIG. 4 would be mapped, according to the mapping scheme shown in Table III above, to firmware head location 0 (or head 222). Similarly, data corresponding to the physical head location 1 (or head 123) of the four-disc stack shown in FIG. 4 would be mapped, according to the mapping scheme shown in Table III, to firmware head location 1 (or head 223), and so forth.

In accordance with the above-described embodiment, the firmware head locations 0, 1, 2 and 3 are identical for two, three and four disc stack arrangements, and, therefore, allow the economic use of the same hub and much of the same control electronics and software for each of those disc stack arrangements. Furthermore, the firmware head locations 4 and 5 are identical for three and four disc stack arrangements, again allowing the economic use of the same hub and much of the same control electronics and software for the three and four disc stack arrangements. Furthermore, the mapping arrangement discussed above can take advantage of the hub and disc balance principles described in the above-cited, U.S. patent application Ser. No. 09/259,779, now U.S. Pat. No. 6,307,706 titled, "Disc Arrangement On A Hydrodynamic Motor."

While, in the above-described embodiments, the firmware head 0 location is the same for the two, three or four disc embodiments (see Tables I, II and II), according to further embodiments, the firmware head 0 location may differ, depending upon the numbers of discs. Thus, the firmware head 0 location for a two disc embodiment may be different than the firmware head 0 location for a four disc embodiment. However, even with a different firmware head 0 location than that shown in the tables above, the firmware head locations 1, 2, etc., preferably follow the firmware head 0 location in sequence, in accordance with the above-described embodiments. In preferred embodiments, the firmware head 0 location is determined, for example, by suitable software (or the like), which determines the most appropriate firmware head 0 location within the stack, based on the number of discs in the stack.

Accordingly, disc drive apparatuses, computer systems employing the same and methods for making, testing and using the same, as described above, can provide manufacturing flexibility in that the same general apparatus design (with minimal modifications) may accommodate a variety of different disc stack arrangements (for example, two, three or four-disc stack arrangements), to meet a variety of different industry demands. Principles of the invention may be applied to other systems involving combinations of different disc totals other than the two, three and four disc arrangements described above In further preferred embodiments, a reading or recording scheme for operating the heads in the head array for disc stack arrangements, such as shown in FIGS. 4, 5 and 6, to, for example, maximize the reading or recording speed capabilities of the disc drive apparatus. As described in more detail below, such embodiments involves operating the heads in seriatim and an alternating order relative to the stack of recording surfaces.

As described above, as part of a reading or recording operation, the actuator moves the head/arm assembly 106 (FIG. 3) and, thus, the head array in the cross-track direction (for example, the general radial direction of the disc). During the generally radial motion of the head array, the heads become aligned with tracks on the disc recording surfaces in the stack.

In one embodiment, the head array is arranged such that a plurality (and more preferably, all) of the heads in the array are at least generally aligned with a respective track at about the same time. For example, the heads may be arranged such that they all align (or generally align) with tracks in a common cylinder at the same time. Alternatively, the heads may be laterally staggered or skewed, such that the heads simultaneously align (or generally align) with tracks in different cylinders. In preferred embodiments, the head array is slightly skewed, such that heads in the array may be operated, one-at-a-time, in series, while the actuator moves the head array in the generally radial direction. In this manner, the actuator movement moves each head into track alignment (or general alignment) in series, corresponding to the operating time for the head in the series of head operating times.

In each of the above embodiments, the head array is moved to (or through) a general alignment position and the heads are operated in seriatim, for example, in the direction from the top of the disc stack (or, preferably, from the firmware head 0 location), down. Thus, at each general track alignment position of the head array, a plurality of heads may be operated in series to access a plurality of tracks in mutually different levels of the stack. In this regard, as the head array is positioned at (or moves across) a track alignment position, a plurality of tracks may be accessed by switching from one head to another (and, possibly making alignment adjustments) without requiring a track seek operation between tracks.

For example, with respect to the four-disc arrangement of FIG. 4, as the head array is moved in the general radial direction, from the outer periphery of the disc, toward the disc center, the head array may first be operated to seek and align with tracks in cylinder 0. Initially, at least one head (for example, the head at firmware head location 0, or head 222) is aligned with the track in cylinder 0 on its associated disc surface, and is operated to read or record data on the track. The next head in the array (for example, the head at firmware head location 1, or head 223) is also aligned with the track in cylinder 0 on its associated disc surface, and is then operated to read or record data on that track. The process continues, wherein further heads (for example, the heads at firmware locations 2, 3, 4 and 5, or heads 322, 323, 422 and 423) in the array are aligned with the tracks in cylinder 0 on their associated disc surfaces and are operated, in series.

Once the head array operation has been switched one pass through the series of heads (for example, from the top of the stack, down, or from the bottom of the stack, up), a further track position may be sought and the head array continues its cross-track movement toward the next track position. In preferred embodiments, the last head (for example, head 423) operated in the series at the previous cylinder location (cylinder 0) is then used to seek the next track (or cylinder) location and is the first head operated at the next track location (for example, the cylinder 1 location). In this regard, instead of returning the head operation to the beginning of the series defined by the previous pass (at the previous track alignment position), the head operation continues with the operation of the head last operated in the previous pass. Operation thereafter switches through the array of heads, in series, but in reverse order with respect to the order of the previous pass (at the previous track alignment position).

As a result, a recording or reading operation involves switching operation of the heads in the array in series with respect to the stack (for example, top down or bottom up) at each general track alignment position in the generally radial motion of the head array, and alternating the direction in which the heads are operated at each new track alignment position of the head array, with respect to the previous track alignment position. A graphical representation of the series of head operating times is shown in FIG. 7, wherein the horizontal axis represents time and the vertical axis represents heads (identified by firmware head location numbers 0–7).

Figure 7:
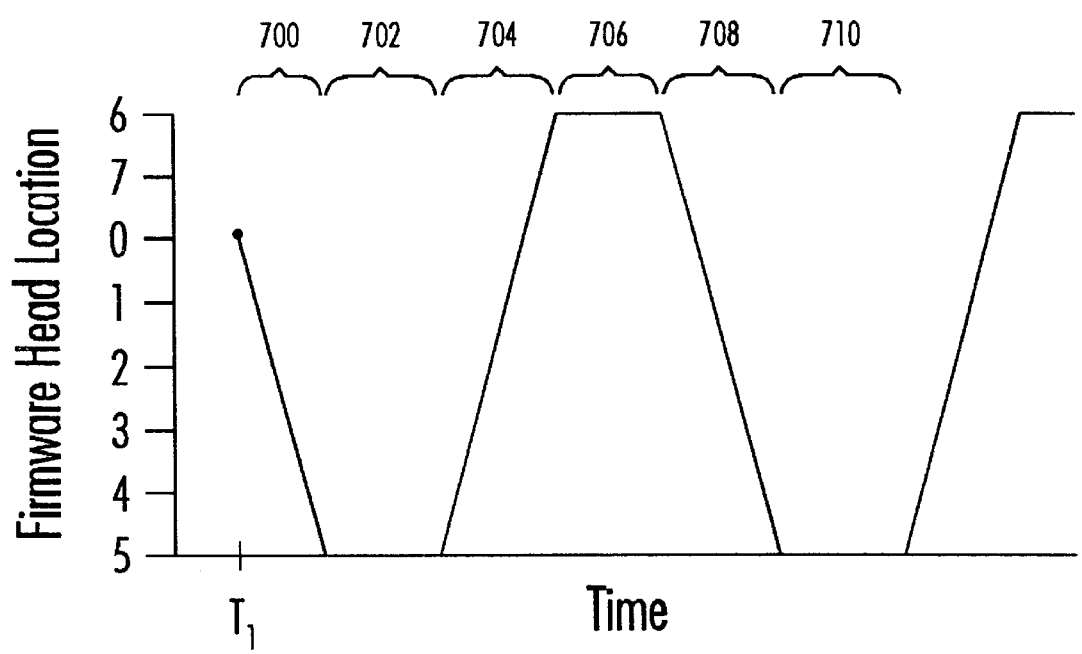
FIG. 7 is a graphical representation of the head array operation over a period of time.

In the FIG. 7 embodiment, as the head array is moved in the generally radial direction of the disc surface, the heads in the array become generally aligned with each cylinder position and, at each cylinder position, are operated in series to access a plurality of tracks in the cylinder. Thus, at time $T_1$, the head at firmware head location 0 becomes generally aligned with the track in cylinder 0 on its associated disc surface and is operated to access (read or record on) that track. Just after time $T_1$, the head at firmware head location 1, which is also generally aligned with the track in cylinder 0 on its associated disc surface, is operated to access that track. Thereafter, the head at firmware location 2, which is also generally aligned with the track in cylinder 0 on its associated disc surface, is operated to access that track. Similarly, the heads at firmware head locations 3, 4 and 5, which are aligned with the tracks in cylinder 0 on their associated disc surfaces, are then operated in series, as described above with respect to the heads at firmware head locations 0 and 1. Thus, in the time period represented by bracket 700, a plurality of heads in the array (at firmware head locations 0–5) become aligned with tracks in a common cylinder (cylinder 0) and are operated in series.

Once the last head in the array is operated (the head at firmware head location 5 in the above example), the head array continues its generally radial motion and a track seek operation is carried out to seek the next track (or cylinder) location. The track seek operation is carried out during the time period represented by bracket 702. Preferably, the track seek operation is carried out with the head last operated in the latest pass through the series of head operations (i.e., the head at firmware head location 5 in the above example). Track seeking routines are well known in the art are not described in further detail herein, for purposes of simplifying the present disclosure.

Upon locating the next track (for example, the track in cylinder 1), the head last operated in the immediately previous pass through the series of heads (the head at firmware head location 5 in the above example) is aligned with the next track (for, example, cylinder 1) and is operated to access that track. Time $T_2$ in the graph of FIG. 7 represents the time at which the head at firmware head location 5 is operated to access the track in cylinder 1 on its associated disc surface. Just after time $T_2$, the head at firmware head location 4, which is generally aligned with the track in cylinder 1 on its associated disc surface, is operated to access that track. Thereafter, the head at firmware head location 3, which is generally aligned with the track in cylinder 1 on its associated disc surface, is operated to access that track. Similarly, the heads at firmware head locations 2, 1, 0, 7 and 6 which are also generally aligned with the tracks in cylinder 1 on their associated disc surfaces, are operated in series, as described above with respect to the heads at firmware head locations 5, 4 and 3. Thus, in the time period represented by bracket 704, a plurality of heads in the array (all of the heads in the array) become generally aligned with tracks in a common cylinder (cylinder 1) and are operated in series, but in the reverse order of the series operation at the previous cylinder (cylinder 0).

Once the last head in the series is operated (the head at firmware head location 6 in the above example), the head array continues its generally radial motion and a second track seek operation is carried out to seek the next track (or cylinder) location. The second track seek operation is carried out during the time period represented by bracket 706. Preferably, the track seek operation is carried out with the head last operated in the latest pass through the series of head operations (i.e., the head at firmware head location 6 in the above example).

The track seek operation involves locating the next track (for example, the track in cylinder 2). The head last operated in the immediately previous pass through the series of heads (the head at firmware head location 6 in the above example) is aligned with the located track (for example, the track in cylinder 2) and is operated to access that track. Time $T_3$ in the graph of FIG. 7 represents the time at which the head at firmware head location 6 is operated to access the track in cylinder 2 on its associated disc surface. The heads in the array are operated in series, from the head at firmware head location 6, to 7, to 0, to 1, to 2, to 3, to 4 and then to 5, in that order (in the time period represented by bracket 708). Thereafter, a further track seek operation is carried out (in the time period represented by bracket 710) and, upon locating the next track (for example, the track in cylinder 3), the heads in the array are operated in series, in the opposite order with respect to the order of the previous pass through the series; that is, from the head at firmware head location 5, to 4, to 3, to 2, to 1, to 0, to 7 and then, to 6.

The head array operation continues in this fashion, wherein the heads are operated in series at each track (or cylinder) position of the head array and thereafter a further track (or cylinder) position is sought and, then, the heads are operated in series, but in the opposite order with respect to the order of operation at the previous track (or cylinder) position. The reversing pattern of head operations over time, as represented in FIG. 7, defines a serpentine graphical representation. The serpentine or reversing series of head operations continues until the last track (or cylinder) position in the reading or recording operation is accessed.

As a result of the serpentine or reversing series of head operations, switching access from one track to another during a recording or reading operation involves either switching from one head to another in the series (and, possibly, minor alignment adjustments) or a track seek operation to seek the next track location at the end of a series pass. Thus, switching from one track to another during a reading or recording operation involves either a delay associated with switching heads or a delay associated with seeking a next track, and need not involve both delays at any one track switching time. More specifically, the head operated as the last head in the series at the latest pass through the series of head operations is the same head that is operated as the first head in the series at the next pass (the preceding pass). Substantial advantages with respect to minimizing track switching delays are, therefore, available when the head array is operated in series, but alternating order as described herein.

In preferred embodiments, the initial series of head operations begins with the head at firmware head location 0 and proceeds through the series to the last head in the array (for example, the head at firmware head location 5 in the four-disc and three-disc arrangement of FIGS. 4 and 5, and the head at firmware head location 3 in the two-disc arrangement of FIG. 6). Accordingly, the serpentine or reversing series of head operations can be employed with the flexible stack configuration design and mapping scheme described above, for accommodating a variable number of discs in the disc stack, in a manner which maximizes manufacturing efficiencies.

For example, one preferred embodiment of the invention involves a method for associating data with a plurality of heads in a disc drive apparatus, wherein the heads are disposed in physical locations in a head array. According to that method, a plurality of data sets are received, wherein each data set is associated with an address corresponding to the physical location of a respective head in the head array. In addition, the number of operable heads in the disc drive apparatus is determined. Based on the number of heads in the apparatus, a new head location scheme is defined, wherein the new head location scheme defines a new head location for each physical head location address. Each data set is associated with the new head location is then associated, based on the new head location scheme, with the physical head location address associated with the data set.

Also in accordance with the above description, a disc drive apparatus according to an embodiment of the present invention is operable with a plurality of data sets respectively associated with a plurality of physical head locations. The apparatus comprises at least one computer readable disc recording medium defining a plurality of disc recording surfaces. The apparatus further comprises a plurality of heads arranged in physical head locations in an array, wherein each head is associated with a respective one of said disc recording surfaces. The apparatus further includes a data storage device for storing data defining a new head location scheme based on the number of operable heads in said head array, the new head location scheme comprising an association of a new head location in the array with each physical head location. The apparatus also includes a controller for associating each data set with the new head location associated, in the new head location scheme, with the physical head location associated with the data set.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the widget while maintaining substantially the same functionality without departing from the scope and spirit of the present invention. In addition, although the preferred embodiment described herein is directed to a widget for a widget system, it will be appreciated by those skilled in the art that the teachings of the present invention can be applied to other systems, like gadget or thingamajig systems, without departing from the scope and spirit of the present invention.

What is claimed is:

1. A method of associating data with a plurality of heads in a disc drive apparatus, wherein the heads are disposed in physical locations in a head array, the method comprising steps of:

(a) receiving a plurality of data sets, each data set associated with an address corresponding to a physical location of a respective head in the head array;

(b) determining a total number operable heads in the disc drive apparatus;

(c) defining a new head location scheme based on the total number of operable heads in the disc drive apparatus, the new head location scheme defining a new head location for each physical head location address; and (d) associating each data set with the new head location defined in step (c).

2. A method as recited in claim 1, wherein said receiving step (a) comprises obtaining operating parameters associated with the heads in the head array.

3. A method as recited in claim 2, wherein said operating parameters comprise head bias voltage values.

4. A method as recited in claim 2, wherein said operating parameters comprise defect lists having data corresponding to a location of track sector defects in recording surfaces associated with the heads.

5. A method as recited in claim 1, wherein said receiving step (a) comprises obtaining reading or recording data associated with the heads in the head array.

6. A method as recited in claim 1, wherein said determining step (b) comprises performing a read operation to attempt to read data at a plurality of potential physical head locations in the head array and determining that no head exists for those physical head locations at which the read operation was unsuccessful.

7. A method as recited in claim 1, wherein said head array comprises a number N of potential physical head locations, wherein the plurality of heads comprises up to N heads located at a corresponding plurality of said potential physical head locations and wherein the determining step (b) comprises performing a read operation at a plurality of potential physical head locations.

8. A method as recited in claim 1, wherein the determining step (b) comprises receiving user input data corresponding to the number of heads.

9. A method as recited in claim 1, wherein the determining step (b) comprises retrieving a pre-recorded disc number.

10. A method as recited in claim 1, wherein the defining step (c) comprises selecting a new head location scheme from a plurality of pre-recorded schemes.

11. A method as recited in claim 1, wherein the defining step (c) comprises storing a plurality of head location schemes, each head location scheme being associated with a unique number N of heads, and selecting a head location scheme of the plurality of head location schemes which corresponds to the total number of heads determined in the determining step (b).

12. A method as recited in claim 11, wherein the plurality of head location schemes includes a scheme associated with a number N=8 heads, a scheme associated with a number N=6 heads and a scheme associated with a number N=4 heads.

13. A method as recited in claim 11, wherein the plurality of head location schemes includes a scheme associated with a number N=8, wherein eight physical head locations in the array, designated as physical head locations 0–7, are mapped to firmware head locations, designated as firmware head locations 0–7, as follows:

| FIRMWARE HEAD LOCATION | PHYSICAL HEAD LOCATION |
|---|---|
| 6 | 0 |
| 7 | 1 |
| 0 | 2 |
| 1 | 3 |
| 2 | 4 |
| 3 | 5 |
| 4 | 6 |
| 5 | 7 |

14. A method as recited in claim 11, wherein the plurality of head location schemes includes a scheme associated with a number N=6, wherein eight physical head locations in the array, designated as physical head locations 2–7, are mapped to firmware head locations, designated as firmware head locations 0–5, as follows:

| FIRMWARE HEAD LOCATION | PHYSICAL HEAD LOCATION |
|---|---|
| 0 | 2 |
| 1 | 3 |
| 2 | 4 |
| 3 | 5 |
| 4 | 6 |
| 5 | 7 |

15. A method as recited in claim 11, wherein the plurality of head location schemes includes a scheme associated with a number N=4, wherein eight physical head locations in the array, designated as physical head locations 2–5, are mapped to firmware head locations, designated as firmware head locations 0–3, as follows:

| FIRMWARE HEAD LOCATION | PHYSICAL HEAD LOCATION |
|---|---|
| 0 | 2 |
| 1 | 3 |
| 2 | 4 |
| 3 | 5 |

16. A method as recited in claim 1, further comprising steps of:

(e) generally aligning said plurality of heads with a corresponding first plurality of data tracks on respective disc surfaces;

f) operating said plurality of heads in series order to access said first plurality of data tracks in series;

(g) generally aligning said plurality of heads with a corresponding second plurality of data tracks on the respective disc surfaces; and (h) operating said plurality of heads in reverse series order with respect to said first operating step, to access said second plurality of data tracks in series.

17. A disc drive apparatus operable with a plurality of data sets respectively associated with a plurality of physical head locations, the apparatus comprising:

at least one computer readable disc recording medium defining a plurality of disc recording surfaces;

a plurality of heads arranged in physical head locations in a head array, wherein each head is associated with a respective one of said disc recording surfaces;

a data storage device for storing data defining a head location scheme based on the number of operable heads in said head array, the head location scheme comprising an association of a head location in the head array with each physical head location; and a controller for associating each data set with the head location associated, in the new head location scheme, with the physical head location associated with the data set.

18. An apparatus as recited in claim 17, further comprising:

means for generally aligning said plurality of heads with a corresponding first plurality of data tracks on respective disc surfaces;

means for operating said plurality of heads to access said first plurality of data tracks in series order;

means for seeking a further alignment position with respect to a second plurality of data tracks and generally aligning said plurality of heads with the second plurality of data tracks on the respective disc surfaces, once the plurality of heads have been operated to access said first plurality of data tracks; and means for operating said plurality of heads to access said second plurality of data tracks in reverse series order with respect to the series order in which the heads were operated to access the first plurality of data tracks.

19. A disc drive apparatus operable with a plurality of data sets respectively associated with a plurality of physical head locations, the apparatus comprising:

at least two discs defining a plurality of disc recording surfaces supported adjacent the plurality of physical head locations;

means for associating each data set with a new head location, based on a physical head location associated with the data set and on the total number of disc recording surfaces defined by the at least two discs.

20. A method of mapping heads in a disc drive to provide a similar mapping scheme for disc drives having different numbers of operable heads, wherein the disc drive is capable of supporting a maximum number N of heads disposed in physical locations in a head array, the method comprising steps of:

(a) determining a total number of operable heads in the head array;

(b) selecting a new head location scheme based on the total number of operable heads in the disc drive; and (c) assigning a new head location for each operable head in the head array, wherein the new head location corresponds to the physical location of the head according to the new head location scheme selected in step (b).

21. A method as recited in claim 20, wherein a new head location scheme for a disc drive having N−2 heads is the same as a portion of a new head location scheme corresponding to the first N−2 heads of a disc drive having N heads.

22. A method as recited in claim 20, wherein a new head location scheme for a disc drive having N−4 heads is the same as a portion of a new head location scheme corresponding to the first N−4 heads of a disc drive having N heads.

* * * * *